US012103985B2

(12) United States Patent
Delgado et al.

(10) Patent No.: US 12,103,985 B2
(45) Date of Patent: Oct. 1, 2024

(54) MICROBIAL DESULFURIZATION AND SURFACE ACTIVATION OF RUBBER

(71) Applicants: Anca Delgado, Tempe, AZ (US); Elham Fini, Phoenix, AZ (US); Sk Faisal Kabir, Tempe, AZ (US)

(72) Inventors: Anca Delgado, Tempe, AZ (US); Elham Fini, Phoenix, AZ (US); Sk Faisal Kabir, Tempe, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 264 days.

(21) Appl. No.: 17/643,377

(22) Filed: Dec. 8, 2021

(65) Prior Publication Data

US 2022/0177608 A1 Jun. 9, 2022

Related U.S. Application Data

(60) Provisional application No. 63/122,693, filed on Dec. 8, 2020.

(51) Int. Cl.
*C08C 19/30* (2006.01)
*C08L 95/00* (2006.01)

(52) U.S. Cl.
CPC .............. *C08C 19/30* (2013.01); *C08L 95/00* (2013.01)

(58) Field of Classification Search
CPC ................................ C08L 95/00; C08C 19/30
USPC .......................................................... 524/59
See application file for complete search history.

(56) References Cited

U.S. PATENT DOCUMENTS

| | | | |
|---|---|---|---|
| 9,193,853 | B2 | 11/2015 | Bohm et al. |
| 2010/0203601 | A1 | 8/2010 | Neumann |
| 2017/0211158 | A1 | 7/2017 | Staedler et al. |

FOREIGN PATENT DOCUMENTS

CN 102993619 A * 3/2013

OTHER PUBLICATIONS

English Machine Translation CN102993619 obtained at Espacenet—Bibliographic data (Year: 2013).*
Aashto T315-12, 2012. Standard Method of Test for Determining the Rheological Properties of Asphalt Binder Using a Dynamic Shear Rheometer (DSR). American Association of State Highway and Transportation Officials, Washington, DC, 32 pages.
AASHTO-T-313-19, 2019. Standard Method of Test for Determining the Flexural Creep Stiffness of Asphalt Binder Using the Bending Beam Rheometer (BBR). American Association of State Highway and Transportation Officials, Washington, DC, 22 pages.
Al-Balakocy et al., "Imparting Antimicrobial Properties to Polyester and Polyamide Fibers-State of the Art," J. Text. Assoc., 2017, 78:179-201.
ASTM-D36/D36M-14, 2014. Standard test method for softening point of bitumen (ring-and-ball apparatus). ASTM International, 5 pages.
ASTM-D4402/D4402M-15, 2015. Standard test method for viscosity determination of asphalt at elevated temperatures using a rotational viscometer. ASTM International, 4 pages.
ASTM-D7173-14, 2014. Standard Practice for Determining the Separation Tendency of Polymer from Polymer Modified Asphalt. ASTM International, 2 pages.
Bacher, 2001. Infrared Spectroscopy Table. Retrieved Jul. 10, 2023, retrieved from URL <https://www.chem.ucla.edu/~bacher/General/30BL/IR/ir.html>, 1 page.
Bressi, S., Fiorentini, N., Huang, J., Losa, M., 2019. Crumb rubber modifier in road asphalt pavements: state of the art and statistics. Coatings 9(6), 384, 22 pages.
Christiansson, M., Stenberg, B., Wallenberg, L., Holst, O., 1998. Reduction of surface sulphur upon microbial devulcanization of rubber materials. Biotech. Lett. 20(7), 637-642.
Cui, X., Zhao, S., Wang, B., 2016. Microbial desulfurization for ground tire rubber by mixed consortium-*Sphingomonas* sp. and *Gordonia* sp. Polym. Degrad. Stabil. 128:165-171.
De Marco Rodriguez, I., Laresgoiti, M., Cabrero, M., Torres, A., Chomon, M., Caballero, B., 2001. Pyrolysis of scrap tyres. Fuel Process. Tech.72(1), 9-22.
Delgado, A.G., Fajardo-Williams, D., Popat, S.C., Torres, C.I., Krajmalnik-Brown, R., 2014. Successful operation of continuous reactors at short retention times results in high-density, fast-rate Dehalococcoides dechlorinating cultures. Appl. Microbiol. Biotech. 98(6), 2729-2737.
Delgado, A.G., Kang, D.-W., Nelson, K.G., Fajardo-Williams, D., Miceli III, J.F., Done, H.Y., Popat, S.C., Krajmalnik-Brown, R., 2014. Selective enrichment yields robust ethene-producing dechlorinating cultures from microcosms stalled at cis-dichloroethene. PloS One 9(6), e100654, 10 pages.
Fini, E.H., A.Samieadel, A.Rajib, 2020. Moisture Damage and Its Relation to Surface Adsorption/Desorption of Rejuvenators. Industrial and Engineering Chemistry Research, 59, 13414-13419.

(Continued)

*Primary Examiner* — Ling Siu Cho
*Assistant Examiner* — Ronald Grinsted
(74) *Attorney, Agent, or Firm* — Fish & Richardson P.C.

(57) ABSTRACT

Preparing a microbially desulfurized crumb rubber includes combining microorganisms capable of breaking crosslinked sulfur bonds, sulfur-containing crumb rubber, and a salt solution to yield a mixture; combining a buffer with the mixture to yield a buffered mixture, thereby adjusting a pH of the mixture; providing oxygen to the buffered mixture; incubating the buffered mixture for a length of time to yield a microbially desulfurized mixture; combining the microbially desulfurized mixture with bitumen to yield a precursor; and heating the precursor to yield the microbially desulfurized crumb rubber. The microbially desulfurized crumb rubber can be combined with bitumen to yield a modified bitumen. The modified bitumen can be combined with asphalt to yield a modified asphalt.

20 Claims, 11 Drawing Sheets

(56) References Cited

OTHER PUBLICATIONS

Fini, E.H., Hung, A.M., Roy, A., 2019. Active Mineral Fillers Arrest Migrations of Alkane Acids to the Interface of Bitumen and Siliceous Surfaces. ACS Sustain. Chem. Eng. 7(12), 10340-10348.

Ghavipanjeh, F., Rad, Z.Z., Pazouki, M., 2018. Devulcanization of ground tires by different strains of bacteria: optimization of culture condition by taguchi method. J. Polym. Environ. 26(8), 3168-3175.

Globenewswire.com, 2019 [online]. Bitumen Market to Reach USD 112.01 Billion by 2026: Reports and Data. Retrieved on Jul. 10, 2023, retrieved from URL <https://www.globenewswire.com/news-release/2019/04/11/1802979/0/en/Bitumen-Market-To-Reach-USD-112-01-Billion-By-2026-Reports-And-Data.html>, 5 pages.

Guo, J., Peng, Y., Ni, B.-J., Han, X., Fan, L., Yuan, Z., 2015. Dissecting microbial community structure and methane-producing pathways of a full-scale anaerobic reactor digesting activated sludge from wastewater treatment by metagenomic sequencing. Microbial Cell Factories 14(1), 33, 11 pages.

Hosseinnezhad, S., Kabir, S.F., Oldham, D., Mousavi, M., Fini, E.H., 2019. Surface functionalization of rubber particles to reduce phase separation in rubberized asphalt for sustainable construction. J. Clean. Prod. 225:82-89.

Huang, Y., Bird, R.N., Heidrich, O., 2007. A review of the use of recycled solid waste materials in asphalt pavements. Resour. Conserv. Recycl. 52(1), 58-73.

Hung, A.M., Pahlavan, F., Shakiba, S., Chang, S.L., Louie, S.M., Fini, E.H., 2019. Preventing Assembly and Crystallization of Alkane Acids at the Silica-Bitumen Interface to Enhance Interfacial Resistance to Moisture Damage. Indust. Eng. Chem. Res. 58(47), 21542-21552.

Jiang, G., Zhao, S., Li, W., Luo, J., Wang, Y., Zhou, Q., Zhang, C., 2011. Microbial desulfurization of SBR ground rubber by *Sphingomonas* sp. and its utilization as filler in NR compounds. Polym. Adv. Tech. 22(12), 2344-2351.

Kabir, S. F., Zheng, R., Delgado, A.G., Fini, E.H., Use of microbially desulfurized rubber to produce sustainable rubberized bitumen. Resources, Conservation and Recycling 2021, 164, 105144, 10 pages.

Kabir, S. F.; Mousavi, M.; Fini, E. H., Selective adsorption of bio-oils' molecules onto rubber surface and its effects on stability of rubberized asphalt. Journal of Cleaner Production 2020, 252, 119856, 9 pages.

Kaewpetch, B., Prasongsuk, S., Poompradub, S., 2019. Devulcanization of natural rubber vulcanizates by Bacillus cereus TISTR 2651. Express Polym. Lett. 13(10), 877-888.

Kim, J.K., Park, J.W., 1999. The biological and chemical desulfurization of crumb rubber for the rubber compounding. J. Appl. Polym. Sci. 72(12), 1543-1549.

Lee, S.-J., Akisetty, C.K., Amirkhanian, S.N., 2008. The effect of crumb rubber modifier (CRM) on the performance properties of rubberized binders in HMA pavements. Construct. Build. Mater. 22(7), 1368-1376.

Li, B., Zhu, X., Zhang, X., Yang, X., Su, X., 2020. Surface area and microstructure of microwave activated crumb rubber modifier and its influence on high temperature properties of crumb rubber modifier binders. Mater. Express 10(2), 272-277.

Li, Y., Zhao, S., Wang, Y., 2012. Improvement of the properties of natural rubber/ground tire rubber composites through biological desulfurization of GTR. J. Polym. Res. 19(5), 9864, 7 pages.

Li, Y., Zhao, S., Wang, Y., 2012. Microbial desulfurization of ground tire rubber by *Sphingomonas* sp.: a novel technology for crumb rubber composites. J. Polym. Environ. 20(2), 372-380.

Liang, M., Xin, X., Fan, W., Ren, S., Shi, J., Luo, H., 2017. Thermo-stability and aging performance of modified asphalt with crumb rubber activated by microwave and TOR. Mater. Des. 127:84-96.

Liu, B., Li, J., Han, M., Zhang, Z., Jiang, X., 2020. Properties of polystyrene grafted activated waste rubber powder (PS-ARP) composite SBS modified asphalt. Const. Build. Mater. 238, 117737, 13 pages.

Marasteanu, M.O., Basu, A., 2004. Stiffness m-value and the Low Temperature Relaxation Properties of Asphalt Binders. Road Mater. Pavement Des. 5(1), 121-131.

Mohammadi-Jam, S., Waters, K., 2014. Inverse gas chromatography applications: A review. Adv. Colloid Interface Sci. 212:21-44.

Mousavi, M., Hosseinnezhad, S.; Kabir, S. F.; Burnett, D. J.; Fini, E. H., Reaction pathways for surface activated rubber particles. Resources, Conservation and Recycling 2019, 149, 292-300.

NIST.gov, 2019 [online]. NIST Chemistry WebBook, SRD 69. Retrieved on Jun. 1, 2023. Retrieved from URL <https://webbook.nist.gov/cgi/cbook.cgi?Value=1015&VType=Vibe&Formula=&AllowExtra=on&Units=SI&cIR=on.2019>, 2 pages.

Presti, D.L., Izquierdo, M., del Barco Carrión, A.J., 2018. Towards storage-stable high-content recycled tyre rubber modified bitumen. Const. Build. Mater. 172:106-111.

Rajib, A.I., Pahlavan, F., Fini, E.H., 2020. Investigating Molecular-Level Factors That Affect the Durability of Restored Aged Asphalt Binder. J. Clean. Prod., 270, 122501, 11 pages.

Segneanu, A.E., Gozescu, I., Dabici, A., Sfirloaga, P., Szabadai, Z., 2012. Organic compounds FT-IR spectroscopy. Macro to Nano Spectroscopy, Uddin (ed.), pp. 145-164.

Shah, A. A.; Hasan, F.; Shah, Z.; Kanwal, N.; Zeb, S., Biodegradation of natural and synthetic rubbers: A review. International Biodeterioration & Biodegradation 2013, 83, 145-157.

Shatanawi, K., Biro, S., Thodesen, C., Amirkhanian, S., 2009. Effects of water activation of crumb rubber on the properties of crumb rubber-modified binders. Int. J. Pavement Eng. 10(4), 289-297.

Shu, X., Huang, B., 2014. Recycling of waste tire rubber in asphalt and portland cement concrete: An overview. Const. Build. Mater. 67:217-224.

Susa, D., Haydary, J., 2013. Sulphur distribution in the products of waste tire pyrolysis. Chem. Papers 67(12), 1521-1526.

Tatangelo, V., Mangili, I., Caracino, P., Bestetti, G., Collina, E., Anzano, M., Branduardi, P., Posteri, R., Porro, D., Lasagni, M., Franzetti, A., 2019. Microbial desulfurization of ground tire rubber (GTR): Characterization of microbial communities and rheological and mechanical properties of GTR and natural rubber composites (GTR/NR). Polym. Degrad. Stab. 160:102-109.

Thodesen, C.; Xiao, F.; Amirkhanian, S. N., Modeling viscosity behavior of crumb rubber modified binders. Construction and Building Materials 2009, 23(9), 3053-3062.

USTires.org [online], Scrap Tire Markets. available on or before Jul. 31, 2020, via Internet Archive: Wayback Machine URL <http://web.archive.org/web/20200731073838/https://www.ustires.org/scrap-tire-markets>, retrieved on Jul. 10, 2023, URL <https://www.ustires.org/scrap-tire-markets>, 3 pages.

Way, G.B., Kaloush, K.E., Biligiri, K.P., 2012. Asphalt-rubber standard practice guide—an overview. Proceedings of the Asphalt Rubber 2012 Conference: Munich, Germany, Oct. 2012, pp. 23-40.

Wen, Y., Liu, Q., Chen, L., Pei, J., Zhang, J., Li, R., 2020. Review and comparison of methods to assess the storage stability of terminal blend rubberized asphalt binders. Const. Build. Mater. 258, 119586, 16 pages.

Xiang, Y., Xie, Y., Long, G., Zeng, L., 2019. Ultraviolet irradiation of crumb rubber on mechanical performance and mechanism of rubberised asphalt. Road Mater. Pavement Des. 20(7), 1624-1637.

Xiaowei, C., Sheng, H., Xiaoyang, G., Wenhui, D., 2017. Crumb waste tire rubber surface modification by plasma polymerization of ethanol and its application on oil-well cement. Appl. Surf. Sci. 409:325-342.

Xie, J., Yang, Y., Lv, S., Zhang, Y., Zhu, X., Zheng, C., 2019. Investigation on Rheological Properties and Storage Stability of Modified Asphalt Based on the Grafting Activation of Crumb Rubber. Polymers 11(10), 1563, 17 pages.

Yao, C., Zhao, S., Wang, Y., Wang, B., Wei, M., Hu, M., 2013. Microbial desulfurization of waste latex rubber with *Alicyclobacillus* sp. Polym. Degrad. Stab. 98(9), 1724-1730.

Yu, H., Leng, Z., Zhou, Z., Shih, K., Xiao, F., Gao, Z., 2017. Optimization of preparation procedure of liquid warm mix additive modified asphalt rubber. J. Clean. Prod. 141:336-345.

(56) References Cited

OTHER PUBLICATIONS

Zani, L., Giustozzi, F., Harvey, J., 2017. Effect of storage stability on chemical and rheological properties of polymer-modified asphalt binders for road pavement construction. Const. Build. Mater. 145:326-335.

* cited by examiner

MICROBIAL DESULFURIZATION AND SURFACE ACTIVATION OF RUBBER

CROSS-REFERENCE TO RELATED APPLICATION

This application claims the benefit of U.S. Patent Application No. 63/122,693 entitled "MICROBIAL DESULFURIZATION AND SURFACE ACTIVATION OF RUBBER" and filed on Dec. 8, 2020, which is incorporated by reference herein in its entirety.

TECHNICAL FIELD

This invention relates to microbial desulfurization and surface activation of rubber for use in asphalt to reduce rubber bitumen separation and improve pavement performance.

BACKGROUND

Rubberized asphalt (asphalt rubber or rubber-modified asphalt) is a mixture of asphalt and crumb rubber. Crumb rubber is a recycled tire rubber made by grinding up scrap tires to yield rubber with a granular consistency. Rubberized asphalt is known for its durability and noise reduction properties.

SUMMARY

This disclosure describes the use of microbially desulfurized rubber in bitumen to reduce the rubber-bitumen separation. Crumb rubber particles are desulfurized by microorganisms that oxidize sulfur as part of their metabolism (e.g., soil or waste activated sludge microorganisms). The percent of desulfurization in crumb rubber using activated sludge is shown to be nearly 34%. Chemical analysis of rubber particles shows a reduction of the peak between 500-540 $cm^{-1}$, associated with disulfide bonds (S—S) and in the range of 2800 $cm^{-1}$, associated with C—H stretching vibration in crumb rubber. The reduction in the above-mentioned peaks can be attributed at least in part to breakage of disulfide bonds as well as oxidation in the C—C backbones, leading to activation of the rubber surface, as evidenced by an increase in the acid-base component of the microbe exposed rubber's surface energy by 3.7 $mJ/m^2$. The increase in surface energy promotes the interaction of rubber particles with bitumen, which reduces the segregation of rubber and bitumen by 68%. Thus, desulfurization is shown to take place in crumb rubber after exposure to microorganisms.

In a first general aspect, preparing a microbially desulfurized crumb rubber includes combining microorganisms capable of breaking crosslinked sulfur bonds, sulfur-containing crumb rubber, and a salt solution to yield a mixture; combining a buffer with the mixture to yield a buffered mixture, thereby adjusting a pH of the mixture; providing oxygen to the buffered mixture; incubating the buffered mixture for a length of time to yield a microbially desulfurized mixture; combining the microbially desulfurized mixture with bitumen to yield a precursor; and heating the precursor to yield the microbially desulfurized crumb rubber.

Implementations of the first general aspect may include one or more of the following features.

In some implementations, the microorganisms oxidize sulfur in the sulfur-containing crumb rubber to yield sulfate. Combining the microorganisms can include combing soil or wastewater sludge that contain the microorganisms. Examples of suitable microorganism include *Acidithiobacillus ferrooxidans* DSM 583, *Thiobacillus perometabolis*, *Thiobacillus ferrooxidans*, *Gordonia desulfuricans*, and *Bacillus cereus* TISTR 2651. In some cases, the microorganisms include one or more of *Sphingomonas* sp., *Alicyclobacillus* sp. *Gordonia* sp., *Thiobacillus* sp., and *Rhodococcus* sp.

Some implementations include incubating the buffered mixture for at least 10 days. Some implementations include heating the precursor to a temperature in a range of about 150° C. to about 180° C., heating the precursor for a length of time between about 10 minutes and about 60 minutes, or both. Some implementations include mixing the precursor in a high shear mixer. Some implementations include assessing a sulfate content of the microbially desulfurized mixture.

In some implementations, the precursor comprises about 10 wt % to about 20 wt % crumb rubber. The salt solution can include sodium, chloride, magnesium, potassium, phosphorus, ammonium, calcium, iron, cobalt, manganese, zinc, boron, molybdenum, nickel, copper, selenium, tungsten, or any combination thereof. In certain implementations, a pH of the buffered mixture is in a range of about 6 to about 8.

A second general aspect includes the microbially desulfurized crumb rubber of the first general aspect.

A third general aspect includes a modified bitumen comprising bitumen and microbially desulfurized crumb rubber. The microbially desulfurized crumb rubber is dispersed in a matrix formed by the bitumen, and the microbially desulfurized crumb rubber has between about 10 wt wt % and about 40% less sulfur than the microbially desulfurized crumb rubber before microbial desulfurization.

Implementations of the third general aspect may include one or more of the following features.

In some implementations, the microbially desulfurized crumb rubber has between about 30 wt % and about 40 wt % less sulfur than the microbially desulfurized crumb rubber before microbial desulfurization. The microbially desulfurized crumb rubber has fewer disulfide bonds than the microbially desulfurized crumb rubber before microbial desulfurization. An elasticity and a stiffness of the modified bitumen typically exceeds an elasticity and stiffness of the bitumen. The modified bitumen typically includes about 10 wt % to about 20 wt % of the microbially desulfurized crumb rubber and about 80 wt % to about 90 wt % of the bitumen. In some cases, an acid-base component of surface energy of the microbially modified crumb rubber exceeds that of the microbially desulfurized crumb rubber before microbial desulfurization by a factor of at least 2.

In a fourth general aspect, a modified asphalt includes aggregate, sand, and the modified bitumen of the third general aspect.

Overall rheological properties of bitumen are improved when desulfurized rubber is introduced. For instance, the stiffness and stress relaxation capacity of bitumen containing desulfurized rubber was found to be 10% and 5% higher than those of the control sample, respectively. Also, the elastic recovery of bitumen containing desulfurized rubber was found to be 6% higher than that of the control.

The details of one or more embodiments of the subject matter of this disclosure are set forth in the accompanying drawings and the description. Other features, aspects, and advantages of the subject matter will become apparent from the description, the drawings, and the claims.

DETAILED DESCRIPTION

Figure 1A:
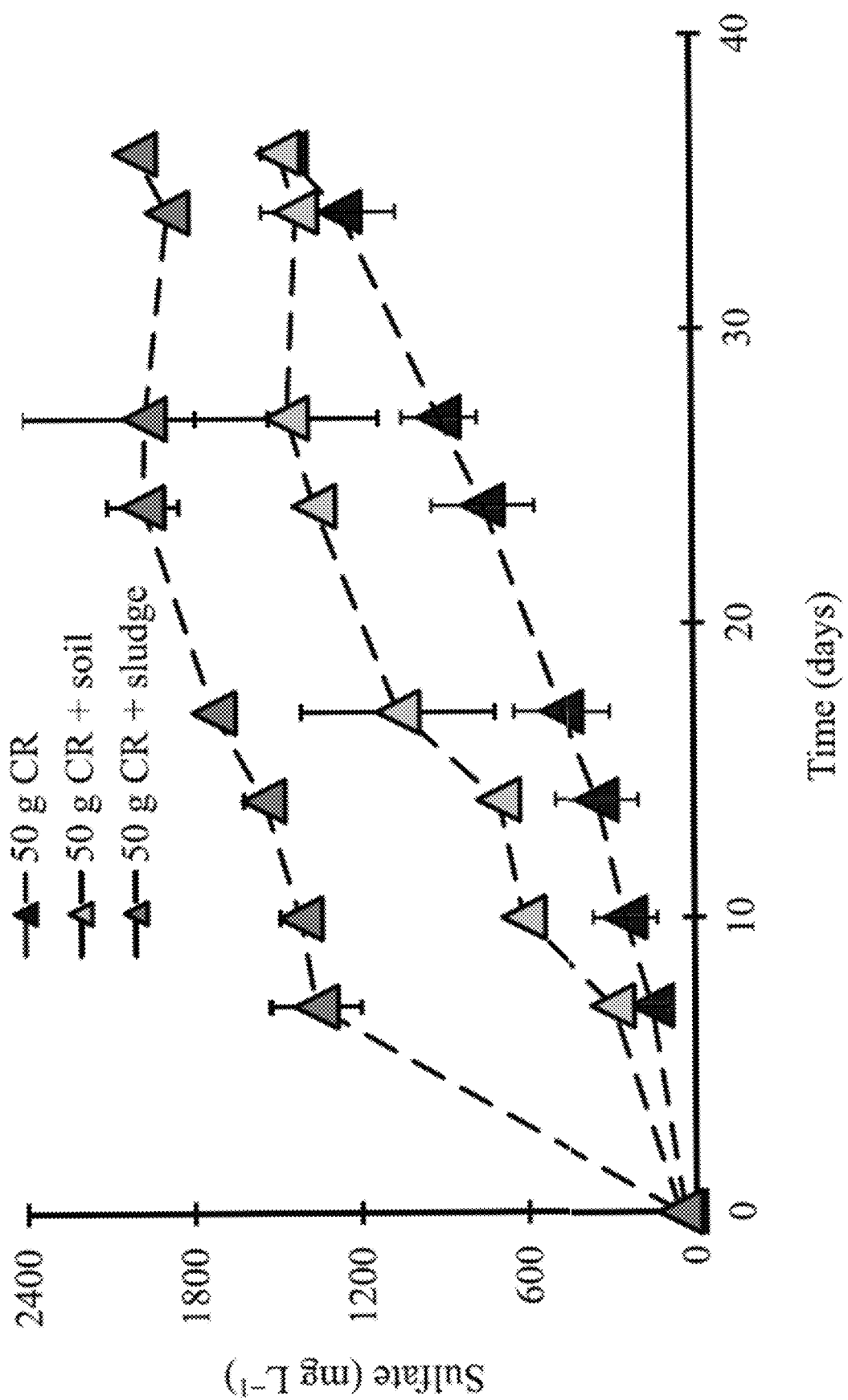
FIG. 1A shows sulfate concentrations released during microbial desulfurization of 50 g of crumb rubber.

This disclosure relates to systems and methods for desulfurization of crumb rubber to enhance its interaction with asphalt. The performance of rubberized asphalt (or crumb rubber asphalt) is superior in terms of durability, service life, and reduced noise. However, rubber treated with sulfur (e.g., vulcanized rubber), which serves to crosslink polymer chains in the rubber, does not disperse well in asphalt. Because the sulfur links the polymer chains together, sulfur-treated rubber does not disperse well in asphalt. As such, sulfur-treated crumb rubber mainly works as an elastic particulate and can give rise to the segregation of rubber and asphalt. As described herein, sulfur-oxidizing microorganisms (non-pathogenic bacteria) are used in a controlled ex-situ bioreactor to break the crosslinked sulfur bonds in rubber polymers. The resulting microbially desulfurized rubber is combined with asphalt to enhance the performance of asphalt pavements. Breakage of the crosslinked sulfur bonds can reduce the amount of agitation required for crumb rubber that has not been desulfurized. Microbial desulfurization also allows a greater percentage of crumb rubber to be used in rubberized asphalt without segregation.

Microorganisms capable of breaking the crosslinked sulfur bonds on the surface of rubber are part of the natural microbiomes of soils, sediments, surface waters, and groundwater. Microorganisms from soil or wastewater sludge can oxidize the sulfur within the rubber polymers in crumb rubber, releasing the sulfur as sulfate and rendering advantageous properties for rubber use in asphalt. Examples of suitable microorganisms include *Acidithiobacillus* sp. and *Sphingomonous* sp. These microorganisms typically couple the oxidation of sulfur with the reduction of oxygen (aerobic process) to obtain energy needed for growth. As a result, asphalt containing microbially desulfurized crumb rubber demonstrates lower phase separation and higher stress relaxation properties when compared to asphalt containing non-treated rubber.

Preparing a microbially desulfurized crumb rubber includes combining microorganisms capable of breaking crosslinked sulfur bonds, sulfur-containing crumb rubber, and a salt solution to yield a mixture. A buffer is combined with the mixture to yield a buffered mixture, thereby adjusting a pH of the mixture. Oxygen is provided to the buffered mixture, and the buffered mixture is incubated for a length of time to yield a microbially desulfurized mixture. The microbially desulfurized mixture is combined with bitumen to yield a precursor, and the precursor is heated to yield the microbially desulfurized crumb rubber.

The microbially desulfurized crumb rubber has between about 10 wt % and about 40 wt % (e.g., between about 30 wt % and about 40 wt %) less sulfur than the microbially desulfurized crumb rubber before microbial desulfurization. The microbially desulfurized crumb rubber has fewer disulfide bonds than the microbially desulfurized crumb rubber before microbial desulfurization. In some cases, an acid-base component of surface energy of the microbially modified crumb rubber exceeds that of the microbially desulfurized crumb rubber before microbial desulfurization by a factor of at least 2.

The microorganisms oxidize sulfur in the sulfur-containing crumb rubber to yield sulfate. The microorganisms can be added as soil or wastewater sludge that contain the microorganisms. Suitable microorganism include *Sphingomonas* sp., *Alicylclobacillus* sp. *Gordonia* sp., *Thiobacillus* sp., and *Rhodococcus* sp, such as *Acidithiobacillus ferrooxidans* DSM 583, *Thiobacillus perometabolis*, *Thiobacillus ferrooxidans*, *Gordonia desulfuricans*, and *Bacillus cereus* TISTR 2651. In some cases, the buffered mixture is incubated for at least 10 days. The precursor can be heated to a temperature in a range of about 150° C. to about 180° C., for a length of time between about 10 minutes and about 60 minutes, or both. In some cases, the precursor is mixed in a high shear mixer. In certain cases, a sulfate content of the microbially desulfurized mixture is assessed.

The precursor typically includes about 10 wt % to about 20 wt % rubber. The salt solution can include sodium, chloride, magnesium, potassium, phosphorus, ammonium, calcium, iron, cobalt, manganese, zinc, boron, molybdenum, nickel, copper, selenium, tungsten, or any combination thereof. In certain implementations, a pH of the buffered mixture is in a range of about 6 to about 8.

The microbially desulfurized crumb rubber is combined with bitumen to yield modified bitumen. The modified bitumen typically includes about 10 wt % to about 20 wt % of the microbially desulfurized crumb rubber and about 80 wt % to about 90 wt % of the bitumen. The microbially desulfurized crumb rubber is dispersed in a matrix formed by the bitumen. An elasticity and a stiffness of the modified bitumen typically exceeds an elasticity and stiffness of the bitumen. The modified bitumen can be combined with aggregate and sand to yield a modified asphalt.

Overall rheological properties of bitumen are improved when desulfurized rubber is introduced. For instance, the stiffness and stress relaxation capacity of bitumen containing desulfurized rubber was found to be 10% and 5% higher than those of the control sample, respectively. Also, the elastic recovery of bitumen containing desulfurized rubber was found to be 6% higher than that of the control.

As described herein, microbial desulfurization of crumb rubber occurs in a bioreactor. The bioreactor is typically fitted with a temperature controller and a pH controller. In one example, a suitable pH is in a range of about 6 to about 8 and a suitable temperature is in a range of about 20° C. to about 37° C. Recycled crumb rubber is added to the bioreactor at a weight ratio of crumb rubber to liquid in a range of about 1 wt % to about 10 wt %. The liquid is typically an aqueous salt solution that includes selected minerals (see, e.g., Tables 1-3). The medium is optimized to allow aerobic sulfur-oxidizing microorganisms to break the sulfur bonds in the crosslinked rubber polymers. Optimization can include adding micronutrients and maintaining the pH of the medium in an optimal range for the microorganisms. The bioreactor is fitted with lines that deliver ambient air or oxygen via an air pump in the medium to increase oxygen availability and to speed up the desulfurization process.

TABLE 1

Composition of salt stock solution per liter

| Chemical | Amount |
|---|---|
| NaCl | 10 g |
| $MgCl_2 \times 6H_2O$ | 5 g |
| $KH_2PO_4$ | 20 g |
| $NH_4Cl$ | 30 g |
| KCl | 30 g |
| $CaCl_2 \times 2H_2O$ | 0.5 g |

TABLE 2

Composition of Trace Element Solution A per liter

| Chemical | Amount |
|---|---|
| HCl (25% solution) | 10 mL |
| $FeCl_2 \times 4H_2O$ | 1.5 g |
| $CoCl_2 \times 6H_2O$ | 0.19 g |
| $MnCl_2 \times 4H_2O$ | 0.1 g |
| $ZnCl_2$ | 70 mg |
| $H_3BO_3$ | 6 mg |
| $Na_2MoO_3 \times 2H_2O$ | 36 mg |
| $NiCl_2 \times 6H_2O$ | 24 mg |
| $CuCl_2 \times 2H_2O$ | 2 mg |

TABLE 3

Composition of Trace Element Solution B per liter

| Chemical | Amount |
|---|---|
| $Na_2SeO_3 \times 5H_2O$ | 6 mg |
| $Na_2WO_4 \times 2H_2O$ | 8 mg |
| NaOH | 0.5 g |

Example

1. Materials and Methods 1.1 Materials and Preparation of Bitumen Containing Crumb Rubber The bitumen used in this study was PG 64-22 (Table 4), obtained from Holy Frontier Company in Phoenix, Arizona. Crumb rubber of <0.25 mm was acquired from Crumb Rubber Manufacturers, Mesa, Arizona. Bitumen samples were prepared by introducing 15% treated (MDR) or untreated (CR) rubber to 85% bitumen at a reduced temperature of 165° C. using a high shear mixer for 30 minutes and named microbially desulfurized rubber modifier (MDRM) and crumb rubber modifier (CRM), respectively. A crumb rubber (CR) sample with mineral medium without microorganisms was also added for comparison; this sample is referred to as CRM plus medium. The mineral medium used for microbial growth was left in place, and it was not centrifuged.

TABLE 4

General properties of PG64-22 bitumen

| Specific Gravity @ 15.6° C. | 1.041 |
|---|---|
| Cleveland Open Cup method Flash point | 335° C. |
| Mass change after RTFO | −0.013 |
| Absolute Viscosity @ 60° C. | 179 Pa · s |
| Stiffness @−12° C. @ 60 s | 71.67 MPa |

1.2 Experiment Setup for Microbial Desulfurization of Crumb Rubber

Microbial desulfurization was performed in 500 mL Erlenmeyer flasks (Corning, Corning City, NY, USA) containing 200 mL mineral medium. Three experimental conditions were set up using duplicate flasks per condition. 50 g of crumb rubber (CR) from the same CR batch were added to each flask. One condition did not receive an external inoculum (denoted 50 g CR). The other two conditions received 10 g soil (50 g CR+10 g soil) per flask or 10 mL of waste activated sludge (50 g CR+10 mL waste activated sludge). It should be noted that the CR used was not sterilized before the experiments. The soil and the waste activated sludge served as an added source of desulfurizing microorganisms. Bitumen was prepared using microbially desulfurized crumb rubber (MDR) from the experiment condition with activated sludge after 36 days of incubation. The mineral medium consisted of 10 mL of a salt stock solution, 1 mL of Trace Element A solution, and 1 mL Trace Element B solution per liter. The composition of these solutions are shown in Tables 1-3. 0.2 mM $FeSO_4$, 25 mM sodium acetate, and 6.3 mM $Na_2S_2O_3 \neq 5H_2O$ were also added. The medium was buffered with 10 mM potassium phosphate and had an initial pH of 7. The soil (a silty clay loam, pH 7.8) was collected from the backyard of a residential area near Arizona State University, Tempe, Arizona, using from a depth of 0.2-0.3 m below ground surface. The soil was homogenized in the laboratory before using in experiments. The waste activated sludge was obtained from the Mesa Northwest Water Reclamation Plant, Mesa, Arizona. The flasks were agitated on a rotary shaker at 170 RPM and incubated at 34° C. The pH was monitored and adjusted to ~7 when it decreased below 6. A solution containing NaCl, $KH_2PO_4$, and $NH_4Cl$ was added every 10 days to ensure the availability of nutrients. The medium was re-added to replace the liquid taken during sampling.

Samples for sulfate analyses were prepared from 1 mL of liquid contents from the incubating flasks. The liquid samples were centrifuged at 4° C. and 156000 rcf for 6.5 min and filtered through 0.2 μm SY13VF syringe filters (Advanced Microdevices PVT. LTD., Ind Area, India). The sulfate concentration was analyzed using a Metrohm 930 Compact IC Flex instrument with a Metrosep A Supp 5-150/4.0 column and A Supp 5 100× carbonate-based eluent. The eluent flow rate was 0.7 mL/min, the temperature was 30° C., and the total analysis time was 19 min. Calibration curves in the range of 0.1-100 mg/L sulfate were made with the Custom Anion Mix: 3 (Cat. No. REAIC1035, Metrohm, Riverview, FL, USA). The samples were diluted 1:10 or 1:20 as appropriate.

1.3. Chemical Characterization

Attenuated Total Reflectance Fourier Transform Infrared Spectroscopy was performed using a Bruker FTIR instrument. The instrument was used in absorbance mode to track the breakage of disulfide bonds and the formation of new covalent bonds during the microbial desulfurization of rubber. For detection of any change, a mid-infrared range diamond ATR was used. A range of 4000 cm$^{-1}$ to 400 cm$^{-1}$ wavenumbers was selected. Before using in FTIR, samples were washed using acetone for five minutes to remove any residue of treatment solution and to ensure no more microbial activity is occurring during the performance characterization tests.

1.4. Surface Energy Analysis

Surface energy was measured using inverse gas chromatography (IGC). This technique was conducted using an IGC-Surface Energy Analyzer, IGC-SEA (Surface Measurement Systems Ltd., Allentown, PA, USA). Before surface energy analysis, samples were preconditioned for 120 min using helium passing the chamber at the rate of 10 scc/m at zero humidity, to remove any impurities from the surface of rubber. To begin the procedure of determining the surface energy, the samples were placed in silanized glass columns with an inner diameter of 4 mm. Next, silanized glass wool was used to fix each sample's position. Throughout the experiment, the temperature of the columns was kept stable at 30° C. Four alkane probes (nonane, octane, heptane, and hexane) were used for dispersive energy. Acid-base energy was determined using two polar probes: dichloromethane for Lewis acid, and ethyl acetate for Lewis base. All probes were run across the column, along with helium as a carrier gas, permitting enough time for the entire probe to elute through the column. Data analysis was performed using IGC-SEA Advanced Analysis Software version 1.4.4.1.

1.5. Rheological Characterization

Viscosity of the rubber samples was measured using a Brookfield rotational viscometer, DVII-Ultra, according to the standard (ASTM-D-4402, 2015). A standard smooth spindle (SC4-27) was used for 10 minutes to apply a continuous shear to measure viscosity. Four viscosity measurements were completed at four temperatures (135° C., 150° C., 165° C., and 180° C.), using a shearing speed of 20 rpm.

1.6. Stiffness and Stress Relaxation Properties

To determine the stiffness and stress relaxation properties of bitumen at subzero temperature, a Bending Beam Rheometer (BBR) was used. The test is a three-point bending test of a bitumen beam with a fixed length, width, and height performed under a cold bath of ethanol. The test measures flexural creep stiffness (S) and stress relaxation capacity (m-value) by applying a load of 980±50 mN for the duration of 240 s at the midpoint of the beam. The beam deflection (d) is measured at the center with respect to loading time using a linear variable differential transducer (LVDT) following the Superpave™ specification (AASHTO-T-313, 2019). The stress relaxation value tells us the bitumen's ability to prevent thermal cracking triggered by a sudden drop of temperature in a cold climate environment.

A testing temperature of −12° C. was selected for this experiment. Using the deformation data during the loading period, the stiffness was determined using Eq. 1:

$$S(t) = \frac{PL^3}{4bh^3 \partial(t)} \quad (1)$$

where:
P=applied constant load (100 g or 0.98 N)
L=distance between beam supports (102 mm) b=beam width (12.5 mm) h=beam thickness (6.25 mm)
S(t)=bitumen stiffness at a specific time, MPa
∂(t)=deflection at a specific time, mm 1.7. Complex Modulus and Phase Angles To measure complex modulus and phase angle of each specimen, a Dynamic Shear Rheometer (DSR) manufactured by an Anton-Paar was used. First, oscillation tests were performed at 10 rad/s to represent traffic conditions with a speed of 90 km/hr (AASHTO-T-315, 2019). The acquired data were then applied to calculate the complex shear modulus (G*) and phase angle (δ) to determine the separation index. In addition, the rutting performance of the modified bitumen was evaluated using the method of multiple stress creep recovery (MSCR) at 52° C., as outlined in the AASHTO-T-315 standard. In all cases, an 8-mm plate with 2-mm gap was used.

1.8. Phase Separation Analysis

The separation tendency of rubber particles from the bitumen is an issue that needs attention for the wet-mixing of bitumen. To determine the separation tendency, the samples were heated to 163° C. to make them sufficiently fluid to pour in aluminum tubes and then tube tops were sealed to bar air from entering. Then, they were placed vertically in a sample holder rack. Tubes were then placed inside an oven at 163° C. for 48 hours. After 48 hours, the rack was put in a freezer for 4 hours at −18° C. Upon cooling the tubes were taken out and cut into three equal segments (ASTM-D7173, 2014). The middle section was discarded, and the bottom and top sections were stored for tests with the dynamic shear rheometer at 58° C. After calculating the complex modulus and according to Eq. 2.

$$SI = \frac{\left(\frac{G^*}{\sin\delta}\right)max - \left(\frac{G^*}{\sin\delta}\right)avg}{\left(\frac{G^*}{\sin\delta}\right)avg} \quad (2)$$

where:
G*=complex shear modulus and
δ=phase angle 1.9. Evaluation of Softening Points Another method to test separation behavior is to test the softening point difference between the top and bottom portions of cigar tube test samples. The softening point is a temperature at which bituminous sample fails to support the weight of a 3.5-g steel ball. Widely used in Europe and Asia, this method can be used to compare the top and bottom parts of cigar tube test samples. Two horizontal disks of poured bitumen supporting two steel balls in brass rings are heated at a controlled rate in a liquid bath to perform this test. The softening point is reported as the mean of the temperatures at which the steel balls are allowed to fall a distance of 25 mm (1.0 inch) (ASTM-D36, 2014).

1.10. Evaluation of Susceptibility to Moisture Damage

To study susceptibility of each specimen to moisture, Moisture-Induced Shear-Thinning Index (MISTI) was calculated using a shear rate sweep test utilizing an Anton-Paar dynamic shear rheometer. Test was performed utilizing a parallel plate set-up (8-mm spindle) at a ramping shear rate of 0.1 to 100 s$^{-1}$. Viscosity of bitumen was measured and plotted versus shear rate. The shear-thinning value was calculated from the slope of the plot of viscosity versus shear rate. To prepare a sample, modified bitumen was blended with glass beads of 100-micron diameter at 50% dosage by the weight of the binder. The glass beads diameter was chosen to be several orders of magnitude smaller than the sample thickness to avoid edge effect and to provide adequate surface area for moisture adsorption to glass beads and initiate moisture damage. Ten samples each weighing 0.30 grams were prepared. Five of the samples were tested in dry condition (unconditioned) and the other five were conditioned in distilled water at 60° C. for 24 hours. After taking the conditioned samples out of water, the samples were surface dried and placed for trimming in the DSR at 25° C. The test temperature was set to 64° C., as the optimal initial viscosity for observing the shear-thinning slope was approximately 1 Pa·s for the samples at that temperature. This was done to observe the effect of moisture damage between aggregate and binder. The average of three replicates was used to determine the MISTI, which is defined as the ratio of thinning slopes of the unconditioned to moisture-conditioned samples.

2. Results and Discussion

Figure 1B:
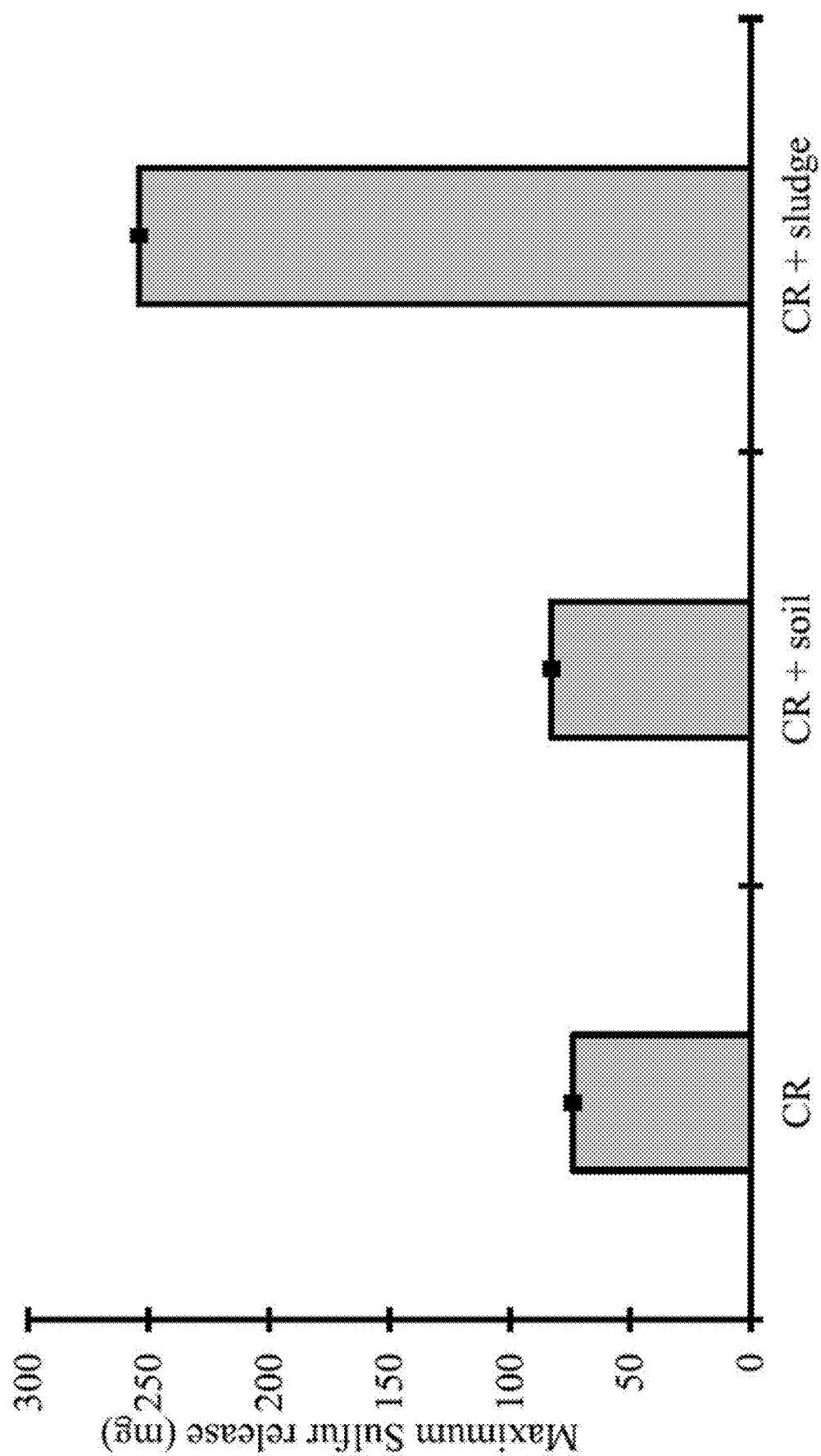
FIG. 1B shows maximum sulfur released by day 36 of the experiments. In panel A, the inoculum were the microbes from the crumb rubber and/or microbes from soil and wastewater activated sludge. The data in shows averages and error bars based on one standard deviation of the mean.

Sulfate concentrations were measured at regular intervals to monitor the rates and extent of microbial desulfurization. FIG. 1A shows the time-course sulfate concentrations in the flasks containing 50 g crumb rubber (CR). As seen in FIG. 1A, sulfate concentrations substantially increased during incubation in all three conditions. The rates of sulfate release were fastest in the flasks with 50 g CR+waste activated sludge; this condition also reached the highest final concentration of ~2000 mg/L sulfate after 36 days of incubation. The amount of sulfate released in CR with waste activated sludge was 35% higher than in the condition with soil and 37% higher than in the condition with medium only. These data strongly indicate that microorganisms capable of breaking the disulfide bonds in the rubber are easily enriched from aerobic environmental samples (e.g., soils, wastewater sludge) and can be effectively stimulated to desulfurize CR by providing them with nutrients and a source of carbon. FIG. 1B is an analysis of the amount of sulfur released per gram of crumb rubber from the experiments in FIG. 1A. It can be seen that the highest release in sulfur per gram crumb rubber was achieved in the samples with 50 g CR+sludge (FIG. 1B).

Sulfur content in tires is found to be 1.5~1.6 wt %. Table 5 shows an estimate of sulfur released and percentage of desulfurization in crumb rubber, assuming 1.5 wt % of sulfur content is present in rubber. Table 5 shows that the percent of desulfurization in the samples with only crumb rubber and medium is 9.82%. Crumb rubber samples with soil microbes showed nearly 11.03% desulfurization which was almost similar in comparison to crumb rubber samples in medium only, whereas crumb rubber samples with activated sludge showed 33.89% desulfurization, which was a major indicator of the success of microbial desulfurization of rubber. Overall, data from desulfurization incubations indicate that the crumb rubber samples were microbially modified.

TABLE 5

Sulfur release and estimated percent of desulfurization.

| Condition | Crumb rubber (g) | Sulfur Content (1.5% of sample weight (mg)) | Sulfur released (FIGS. 1A-1B) | % Desulfurization (Sulfur released/sulfur content) |
| --- | --- | --- | --- | --- |
| CR (medium only) | 50 | 750 | 73.62 | 9.82 |
| CR + soil | 50 | 750 | 82.71 | 11.03 |
| CR + sludge | 50 | 750 | 254.17 | 33.89 |

2.1. Chemical Characterization

Figure 2:
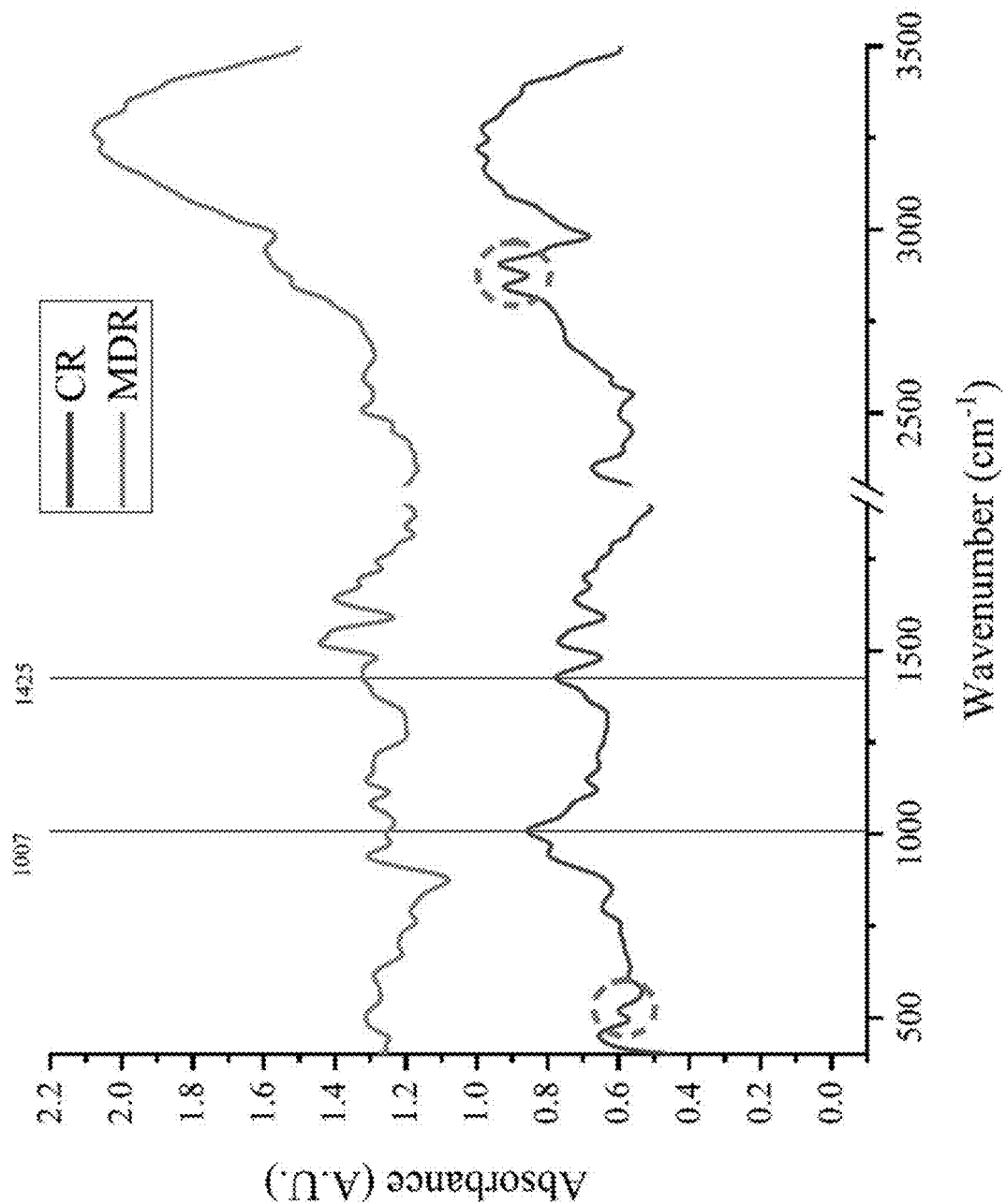
FIG. 2 shows Fourier transform infrared spectroscopy (FTIR) spectra of control crumb rubber (CR) and microbially desulfurized rubber (MDR) using microbes from wastewater sludge.

Spectroscopy results based on ATR-FTIR spectra show significant changes in microbially desulfurized rubber (MDR) in comparison to non-desulfurized crumb rubber (CR) (FIG. 2). For instance, in microbially desulfurized rubber, a significant reduction of disulfide bonds (SS) in the range 500-540 $cm^{-1}$ was observed compared to crumb rubber. This disulfide bond appears in rubber as a crosslinking agent. The reduction in peak can be associated to partial desulfurization of the rubber's surface due to microbial treatment. In CR, the characteristic peak of butadiene is visible in the range of 1000-1015 $cm^{-1}$ (NIST, 2019). This peak is weaker in the spectra for MDR (NIST, 2019). A significant reduction in a medium peak in the range of 1350-1470 $cm^{-1}$ is observed in microbially desulfurized rubber in comparison to crumb rubber. This reduction can be attributed to the bending vibration due to methyl group deformation. For both cases, the reduction in peaks can be associated to partial desulfurization of the rubber's surface due to microbial treatment. The 2800 $cm^{-1}$ peaks (2 bands) are related to stretching vibrations of $CH_3$, $CH_2$, and $CH$, which also reduced after microbial treatment indicating occurrence of partial devulcanization.

2.2. Surface Energy Measurement

The surface energy of samples was measured using inverse gas chromatography (IGC). The IGC results demonstrated that the total surface energy of rubber particles increased by 3.18% due to desulfurizing of rubber. This was more clearly apparent for the acid-base part of surface energy, which was 3.7 $mJ/m^2$ higher after desulfurizing. The observed increase in surface energy profile could be due to partial devulcanization from breakage of disulfide bonds via microbial treatment. At 0.02 n/nm coverage, the acid-base component was 1.85 $mJ/m^2$ for control rubber; this value was increased by 3.7 $mJ/m^2$ (197%) to 5.5 $mJ/m^2$ for desulfurized rubber (Table 6). This improvement is significant, as it has been documented that activation of rubber leads to an increase in the acid-base component of surface energy. Such an increase in the acid-base component can promote interactions with bitumen molecules, reducing the phase separation (segregation of rubber particles) in the bituminous matrix.

TABLE 6

Surface energy ($mJ/m^2$) of control (CR) and desulfurized (MDR) rubber at 0.02 n/nm surface coverage.

| Sample | Dispersive | Acid-base | Total Surface Energy |
| --- | --- | --- | --- |
| CR | 62.89 | 1.85 | 64.74 |
| MDR | 61.25 | 5.55 | 66.80 |

2.3. Viscosity Measurements

Figure 3:
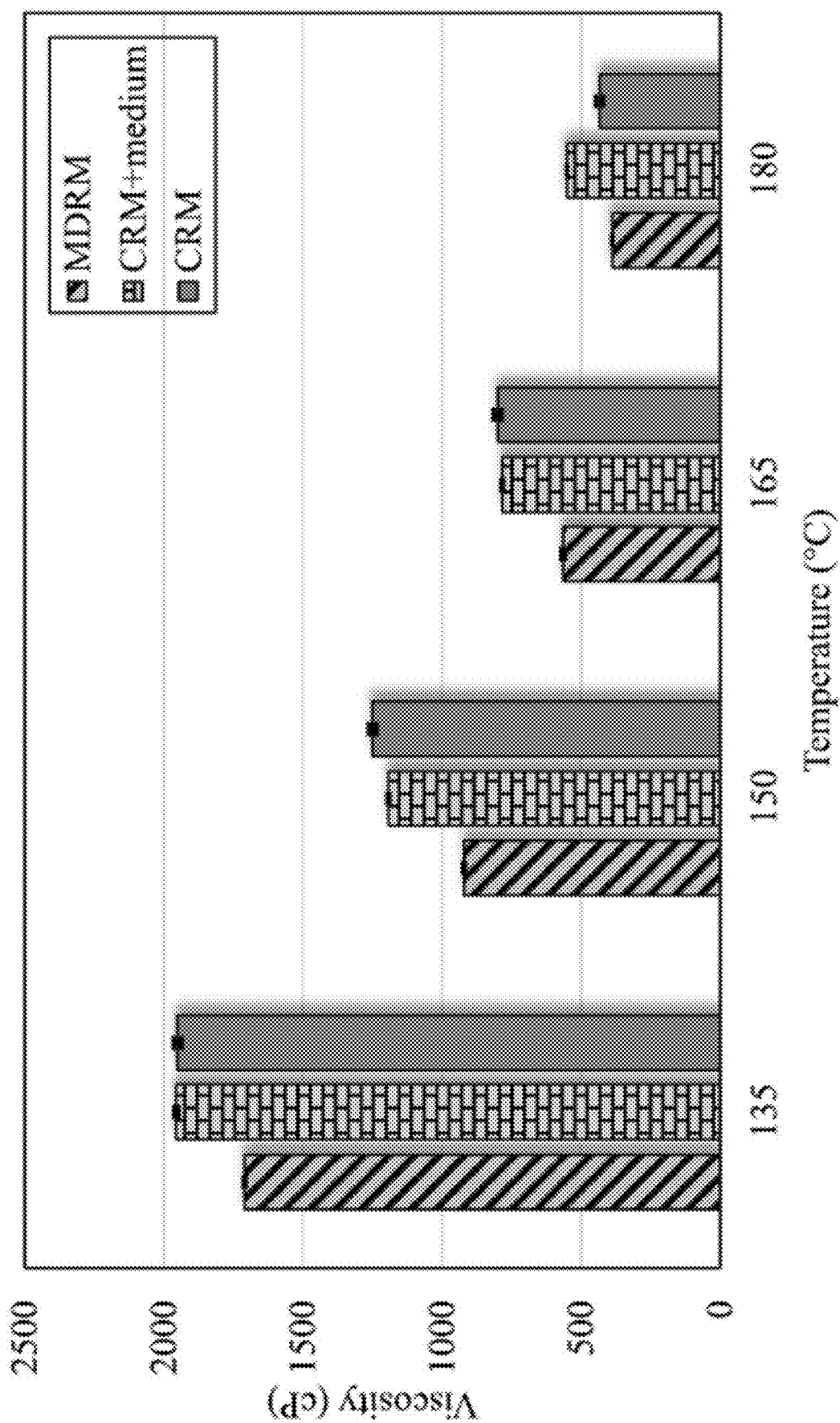
FIG. 3 shows viscosity of desulfurized and non-desulfurized rubber-modified bitumen.

FIG. 3 shows the viscosity results for crumb rubber modifier (CRM), CRM+medium, and microbially desulfurized rubber modifier (MDRM) at 135° C., 150° C., 165° C. and 180° C. A considerable reduction in viscosity of sulfurized rubber, at all testing temperatures. For instance, the viscosity at 135° C. at 20 rpm in the microbially desulfurized rubber modifier was 12.5% lower than the crumb rubber modifier. The lower viscosity and consequent improved flowability of the microbially desulfurized rubber modifier are probably due to partial breaking of crosslinks and disulfide bonds in the crumb-rubber-modified bitumen.

2.4. Thermal Cracking Properties (Low Temperature)

Figure 4:
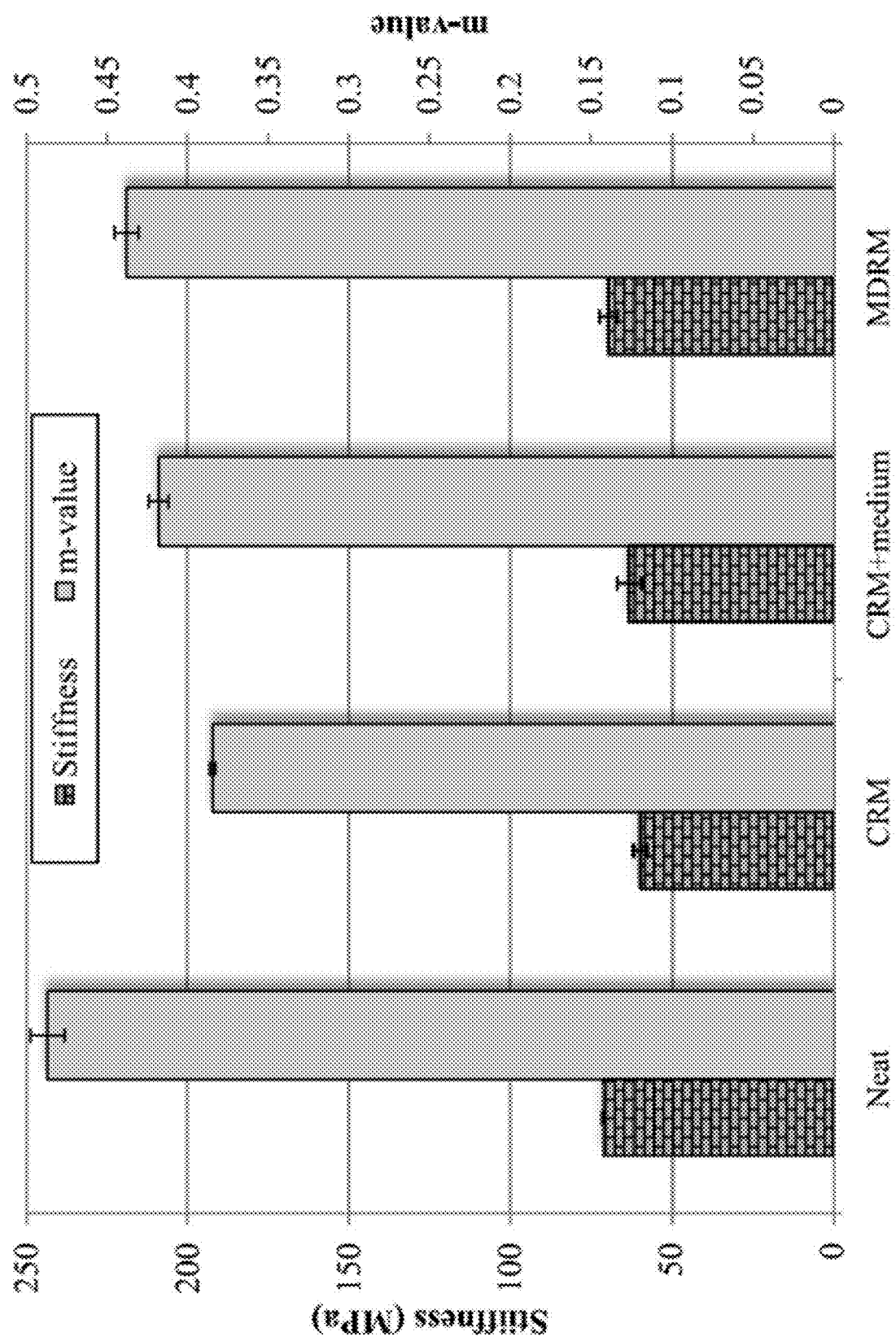
FIG. 4 shows stiffness and m-value results for samples at −12° C. using a Bending Beam Rheometer (BBR).

Bending Beam Rheometer (BBR) provides sub-zero temperature stiffness and relaxation properties of bitumen which in turn shows the ability of bitumen to resist low temperature cracking. Traditional blending with rubber has shown to have decreased stiffness and increased m-value with increasing crumb-rubber percentage. FIG. 4 shows stiffness and stress relaxation values (m-values) of all modifications and neat at −12° C. It was observed that due to the presence of traditionally blended crumb rubber, stiffness and m value both decreased in crumb rubber modifier (CRM) in comparison to neat bitumen. However, with microbially desulfurized rubber-modified bitumen, stiffness increased up to 10% and the stress relaxation value increased by 5% compared to the traditional blend of crumb rubber modifier. This increase in stress relaxation capacity indicates that surface desulfurization of rubber using microbial treatment successfully enhanced the binder's ability to resist thermal cracking at low temperatures.

2.5. Separation Tendency

Figure 5:
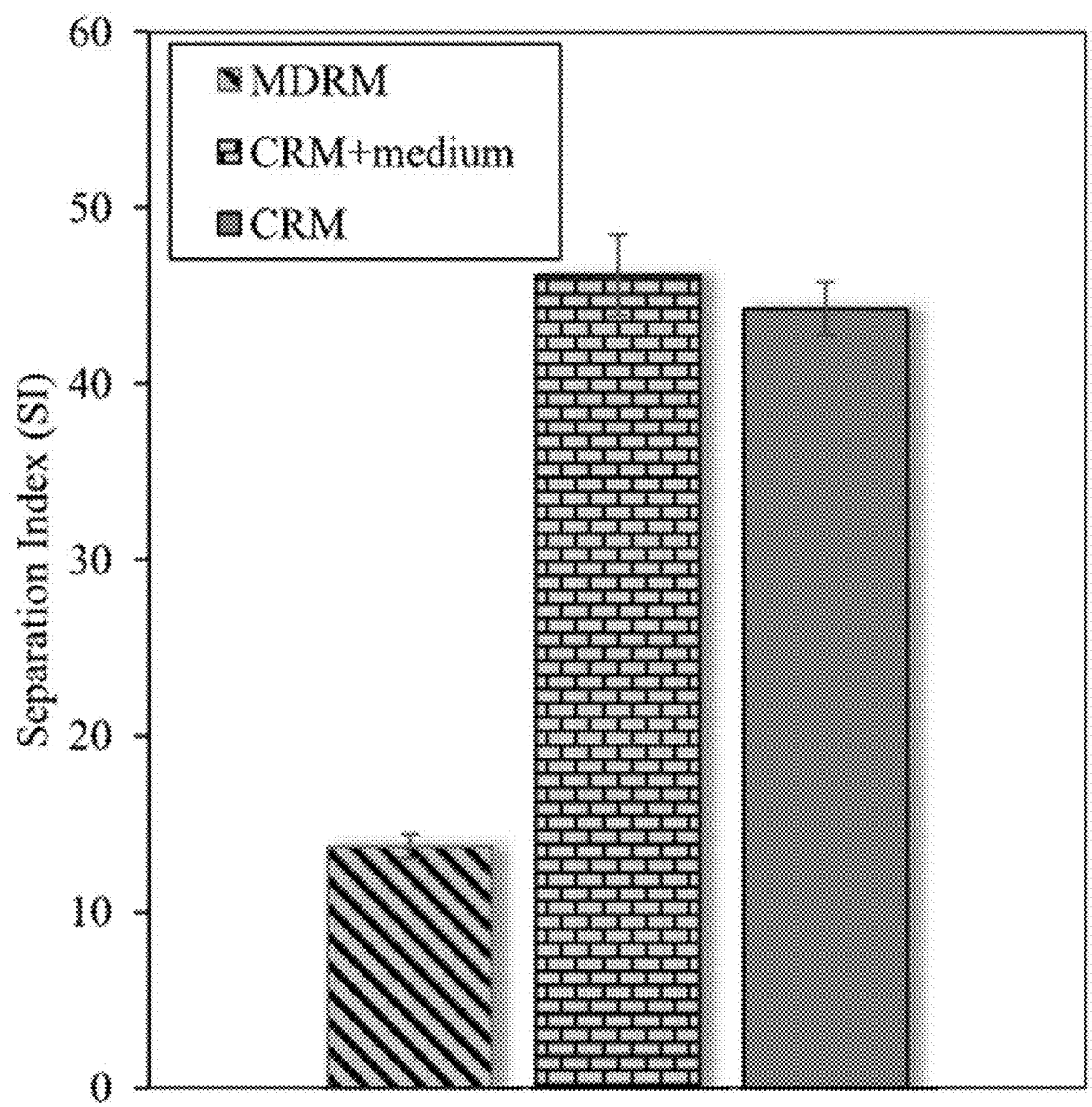
FIG. 5 shows separation index of various desulfurized and non-desulfurized rubber samples.

The separation index (SI) for all desulfurized and non-desulfurized samples was calculated using data from the cigar tube test, as shown in FIG. 5. FIG. 5 shows that the SI value of desulfurized sample (MDRM) is substantially lower than the SI of the traditional blend of crumb rubber modifier (CRM). FIG. 5 also shows that there was no substantial reduction in segregation in the sample that added only medium without any microorganisms to crumb rubber. This indicates success of the desulfurizing method to enhance the compatibility of rubber and the bitumen. Microbially desulfurized rubber-modified bitumen has a separation index 68% lower than CRM. This indicates better absorption and dispersion of rubber particles in the bitumen matrix. Separation of rubber from bitumen causes storage stability issue in wet process of rubberized bitumen which is a major challenge for widespread application of rubberized bitumen.

Figure 6:
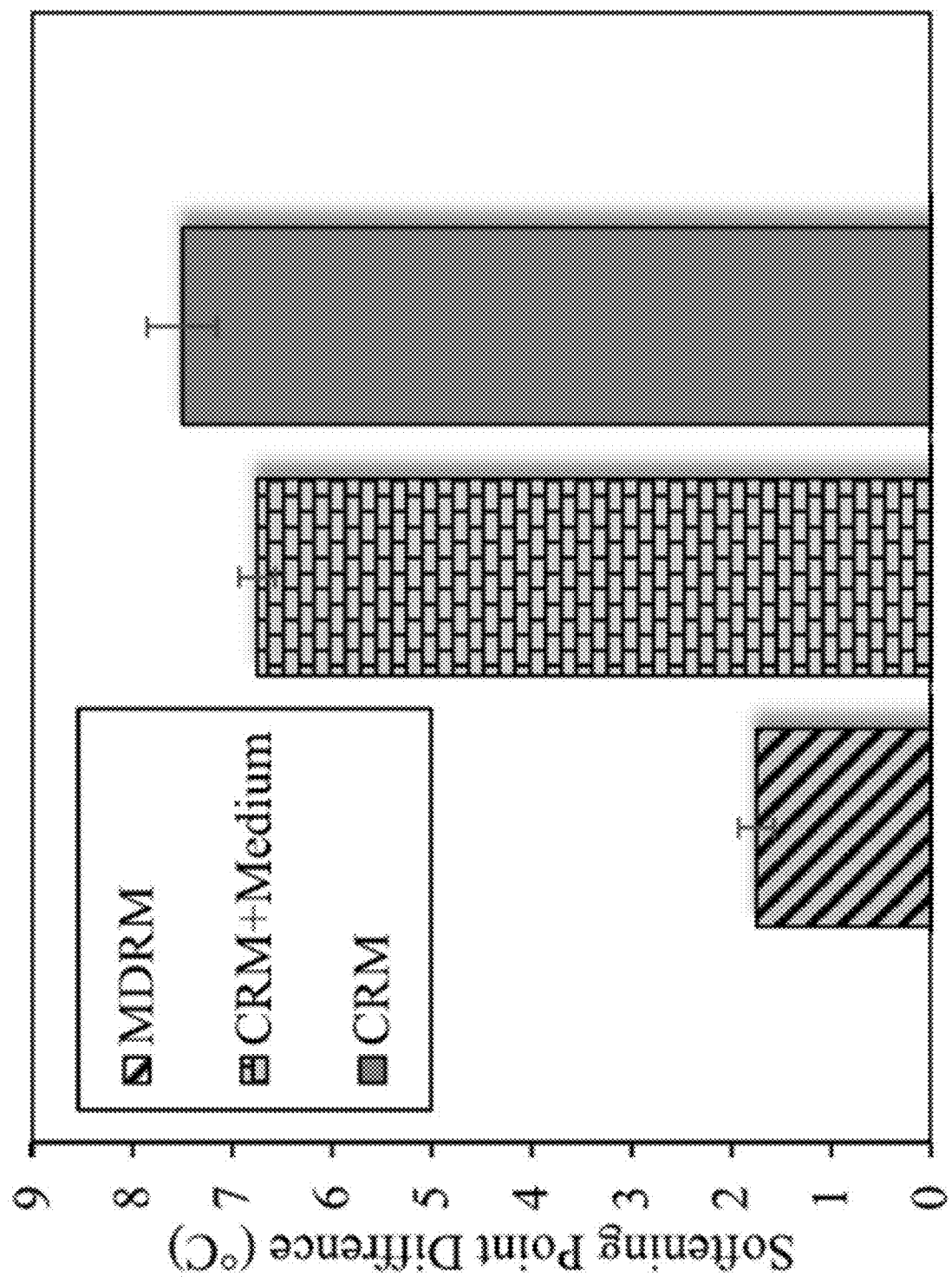
FIG. 6 shows softening point difference between top and bottom portions of cigar tube test, for all modifiers.

Separation tendency was also measured by the widely used softening point test. In this case, the difference in the softening point between the top and bottom portions of the cigar tube was measured. FIG. 6 shows the difference between the softening points of the top and bottom sections. The microbially desulfurized crumb rubber modifier has an average 1.75° C. difference between its top and bottom segments, which is within the acceptable range of 5° C., whereas crumb rubber modifier+medium has a softening point difference between top and bottom sections of 6.75° C., and crumb rubber modifier has a softening point difference between top and bottom sections of 7.5° C. This is another indication of the successful partial breaking of the three-dimensional network in rubber using microbial desulfurization.

2.6. Multiple Stress Creep Recovery (MSCR)

Figure 7:
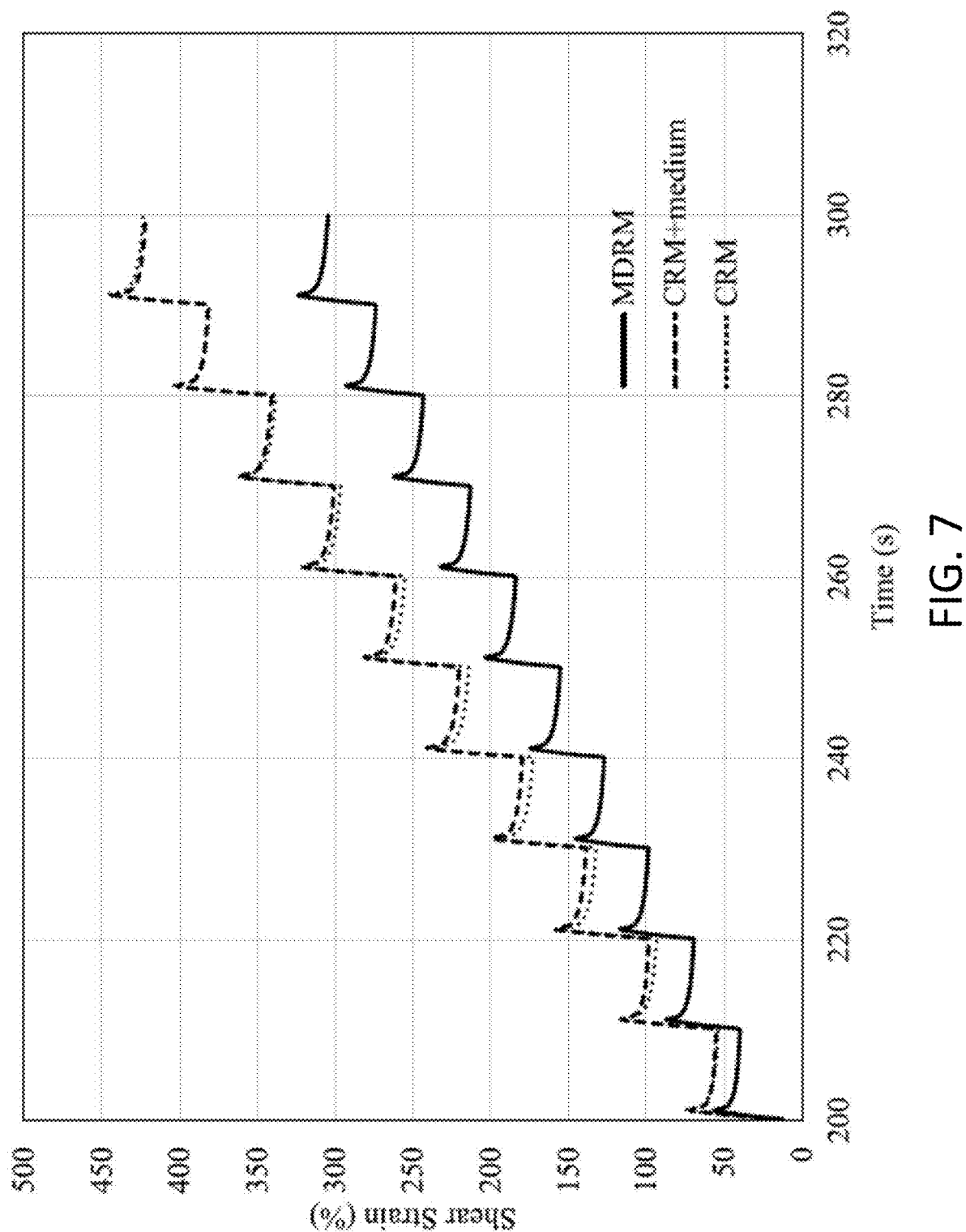
FIG. 7 shows strain accumulation data from multiple stress creep recovery (MSCR) tests for desulfurized and non-desulfurized rubber modifiers.

MSCR data from FIG. 7 show that the strain accumulation with time is 28% lower in microbially desulfurized rubber modifier (MDRM) compared to crumb rubber modifier (CRM). Lower strain accumulation means higher elasticity, which indicates microbial activity not only partially desulfurized the particles, but the dangling bonds must also have revulcanized and been better adsorbed in the bitumen. This indicates that microbially desulfurized rubber is less susceptible to rutting than crumb rubber.

Figure 8A:
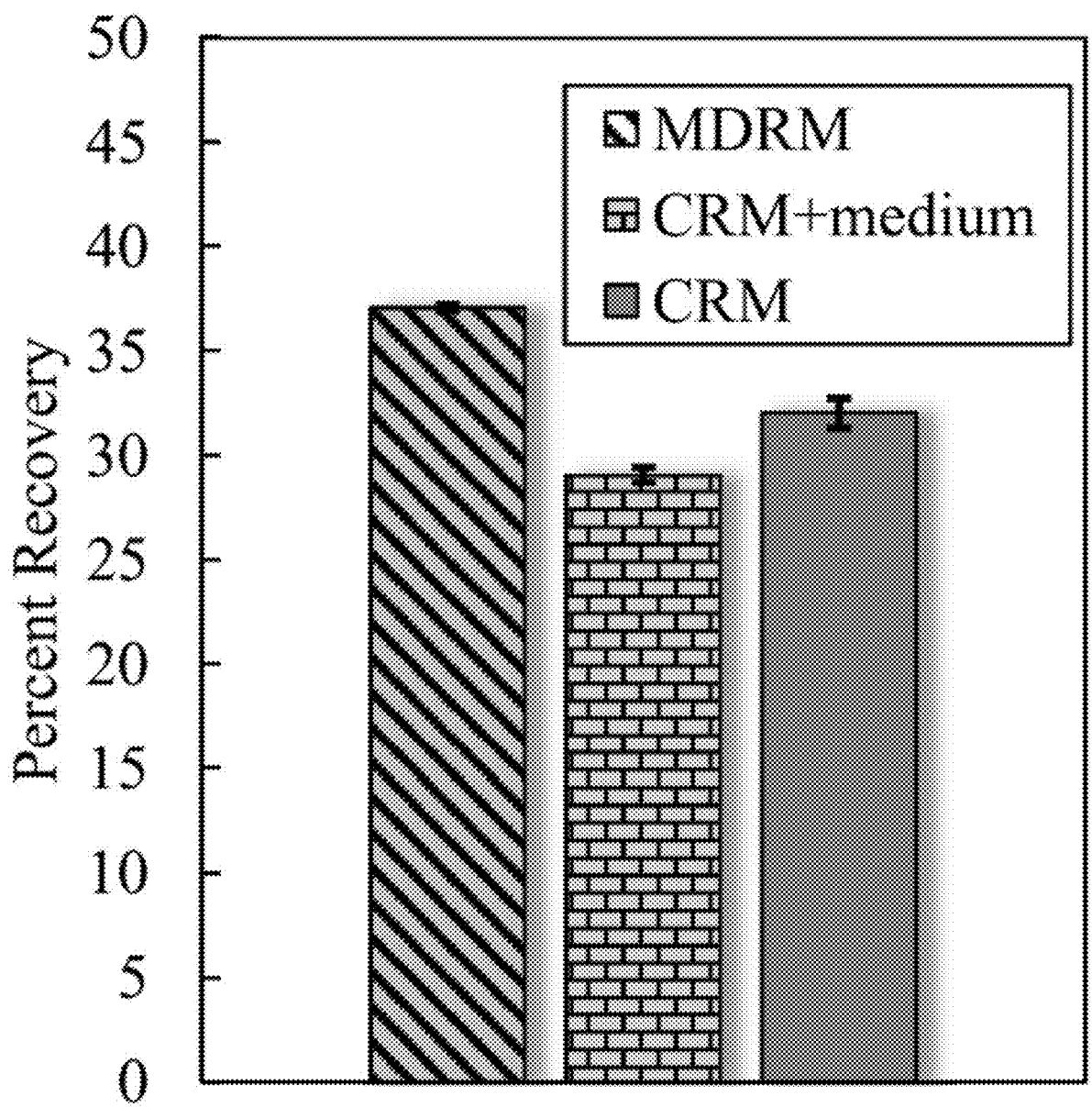
FIGS. 8A and 8B show percent recovery and Jnr data, respectively, from MSCR test for non-desulfurized rubber and desulfurized rubber modifiers.

FIG. 8A shows the Jnr values and percent recovery obtained in an MSCR test. It is clear that the Jnr values of crumb rubber modifier (CRM) and CRM+medium are almost equal. In terms of percent recoverable strain at 3.2 kPa, it was found that CRM has an average percent recovery of 31%, whereas microbially desulfurized rubber modifier has an average percent recovery of 37%. This increase in percent recovery is significant at the bitumen level and proves the efficacy of microbially desulfurized rubber in resisting permanent deformation or so called rutting distress in pavements which is commonly observed under vehicles' wheel path.

2.7. Moisture-Induced Shear-Thinning Index

Figure 8B:
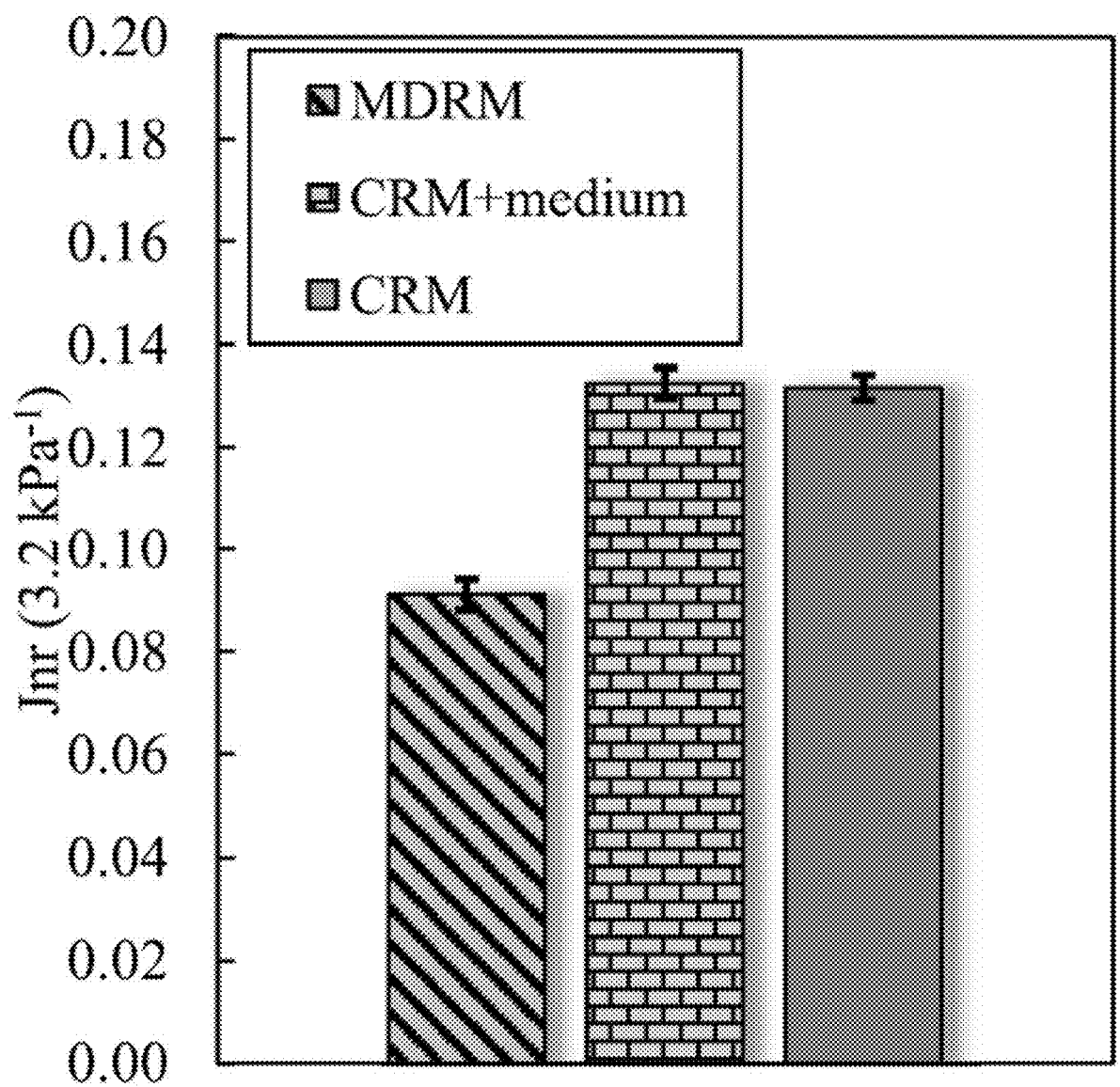
Figure 9:
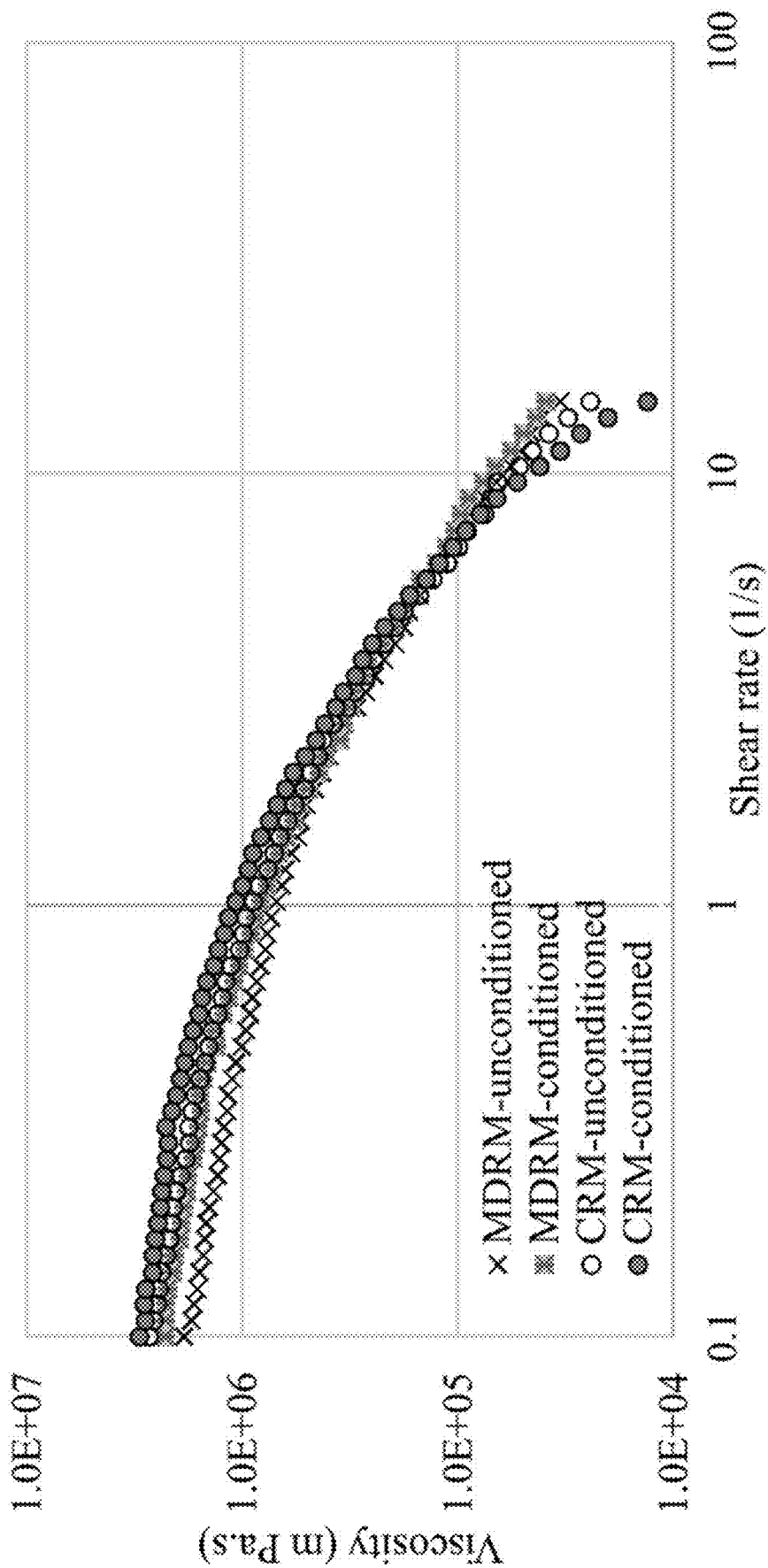
FIG. 9 is a plot showing unconditioned and moisture-conditioned shear-thinning behavior for all rubber modifiers.

To evaluate the effect of moisture on binder-aggregate interactions in the crumb rubber modifier (CRM) and microbially desulfurized rubber modifier (MDRM) samples, a MISTI test was performed. FIG. 8B shows the data for the unconditioned and moisture-conditioned shear-thinning behavior of all rubber-modified bitumen samples.

Table 7 shows the moisture-induced shear-thinning index for crumb rubber modifier (CRM) and for microbially desulfurized rubber modifier (MDRM). Both samples showed a steeper slope after moisture conditioning, with the changes being more evident in the microbially devulcanized sulfurized samples. The latter could be attributed to the presence of freed-up sulfur due to the microbes' activity and breakage of disulfide bonds in microbially desulfurized rubber; upon exposure to water, this freed-up sulfur could give rise to the formation of acidic compounds. Thus, acidic compounds have been implicated in moisture damage. Ensuring the complete removal of sulfur from microbially desulfurized rubber before introducing it to bitumen could alleviate the issue.

TABLE 7

Absolute value of power-law slopes and MISTI values for control crumb rubber modifier (CRM) and microbially desulfurized rubber modifier (MDRM)

| | | Unconditioned | Conditioned |
|---|---|---|---|
| CRM | Power-Law Slope | 1.896 | 1.93 |
| | COV (3 samples) | 4.62% | 3.85% |
| | MISTI (Unconditioned/Conditioned) | | 98% |
| MDRM | Power-Law Slope | 1.05 | 1.48 |
| | COV (3 samples) | 6.6% | 3.69% |
| | MISTI (Unconditioned/Conditioned) | | 71% |

Although this disclosure contains many specific embodiment details, these should not be construed as limitations on the scope of the subject matter or on the scope of what may be claimed, but rather as descriptions of features that may be specific to particular embodiments. Certain features that are described in this disclosure in the context of separate embodiments can also be implemented, in combination, in a single embodiment. Conversely, various features that are described in the context of a single embodiment can also be implemented in multiple embodiments, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular embodiments of the subject matter have been described. Other embodiments, alterations, and permutations of the described embodiments are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results.

Accordingly, the previously described example embodiments do not define or constrain this disclosure. Other changes, substitutions, and alterations are also possible without departing from the spirit and scope of this disclosure.

What is claimed is:

1. A method of preparing microbially desulfurized crumb rubber, the method comprising:
   combining microorganisms capable of breaking crosslinked sulfur bonds, sulfur-containing crumb rubber, and a salt solution to yield a mixture;
   combining a buffer with the mixture to yield a buffered mixture, thereby adjusting a pH of the mixture;
   providing oxygen to the buffered mixture;
   incubating the buffered mixture for a length of time to yield a microbially desulfurized mixture;
   combining the microbially desulfurized mixture with bitumen to yield a precursor, wherein the bitumen comprises about 80 wt % to about 90 wt % of the precursor; and
   heating the precursor to yield the microbially desulfurized crumb rubber.

2. The method of claim 1, wherein the microorganisms oxidize sulfur in the sulfur-containing crumb rubber to yield sulfate.

3. The method of claim 1, wherein combining the microorganisms comprises combing soil or wastewater sludge that contain the microorganisms.

4. The method of claim 1, wherein the microorganisms comprise one or more of *Acidithiobacillus ferrooxidans* DSM 583, *Thiobacillus perometabolis*, *Thiobacillus ferrooxidans*, *Gordonia desulfuricans*, and *Bacillus cereus* TISTR 2651.

5. The method of claim 1, wherein the microorganisms comprise one or more of *Sphingomonas* sp., *Alicylclobacillus* sp. *Gordonia* sp., *Thiobacillus* sp., and *Rhodococcus* sp.

6. The method of claim 1, wherein a pH of the buffered mixture is in a range of about 6 to about 8.

7. The method of claim 1, further comprising incubating the buffered mixture for at least 10 days.

8. The method of claim 1, wherein heating the precursor comprises heating the precursor to a temperature in a range of about 150°° C. to about 180° C.

9. The method of claim 1, wherein heating the precursor comprises heating the precursor for a length of time between about 10 minutes and about 60 minutes.

10. The method of claim 1, wherein the precursor comprises about 10 wt % to about 20 wt % of the crumb rubber.

11. The method of claim 1, wherein the salt solution comprises sodium, chloride, magnesium, potassium, phosphorus, ammonium, calcium, iron, cobalt, manganese, zinc, boron, molybdenum, nickel, copper, selenium, tungsten, or any combination thereof.

12. The method of claim 1, further comprising mixing the precursor in a high shear mixer.

13. The method of claim 1, further comprising assessing a sulfate content of the microbially desulfurized mixture.

14. The microbially desulfurized crumb rubber of claim 1.

15. The method of claim 1, wherein providing oxygen comprises delivering ambient air or oxygen to the buffered mixture via an air pump.

16. The method of claim 1, wherein the buffered mixture comprises about 1 wt % to about 10 wt % of the sulfur-containing crumb rubber.

17. The method of claim 1, wherein the microbially desulfurized crumb rubber has between about 10 wt % and about 40 wt % less sulfur than the sulfur-containing crumb rubber.

18. The method of claim 17, wherein the microbially desulfurized crumb rubber has between about 30 wt % and about 40 wt % less sulfur than the sulfur-containing crumb rubber.

19. The method of claim 1, wherein the elasticity and stiffness of the modified bitumen exceed the elasticity and stiffness of the bitumen.

20. A method of preparing microbially desulfurized crumb rubber, the method comprising:
   combining wastewater sludge containing microorganisms capable of breaking crosslinked sulfur bonds, sulfur-containing crumb rubber, and a salt solution to yield a mixture;
   combining a buffer with the mixture to yield a buffered mixture, thereby adjusting a pH of the mixture;
   providing oxygen to the buffered mixture;
   incubating the buffered mixture for a length of time to yield a microbially desulfurized mixture;
   combining the microbially desulfurized mixture with bitumen to yield a precursor; and
   heating the precursor to yield the microbially desulfurized crumb rubber.

* * * * *

UNITED STATES PATENT AND TRADEMARK OFFICE
CERTIFICATE OF CORRECTION

PATENT NO. : 12,103,985 B2
APPLICATION NO. : 17/643377
DATED : October 1, 2024
INVENTOR(S) : Delgado et al.

Page 1 of 1

It is certified that error appears in the above-identified patent and that said Letters Patent is hereby corrected as shown below:

In the Claims

Claim 8, Column 13, Line 42, delete "150°° C." and insert -- 150° C. --.

Signed and Sealed this
First Day of April, 2025

Coke Morgan Stewart
*Acting Director of the United States Patent and Trademark Office*